United States Patent [19]
Fukuda et al.

[11] Patent Number: 5,116,187
[45] Date of Patent: May 26, 1992

[54] AUTOMATIC SPEED CHANGING APPARATUS FOR WHEEL LOADER

[75] Inventors: Masao Fukuda; Yasuo Yamazaki, both of Saitama, Japan

[73] Assignee: Kabushiki Kaisha Komatsu Seisakusho, Tokyo, Japan

[21] Appl. No.: 457,776
[22] PCT Filed: May 24, 1988
[86] PCT No.: PCT/JP88/00501
§ 371 Date: Jan. 5, 1990
§ 102(e) Date: Jan. 5, 1990
[87] PCT Pub. No.: WO89/11407
PCT Pub. Date: Nov. 30, 1989

[51] Int. Cl.⁵ ............................................. E02F 3/84
[52] U.S. Cl. ............................... 414/699; 37/118 A; 37/DIG. 1; 364/424.07
[58] Field of Search .......... 37/118 R, 118 A, DIG. 1, 37/DIG. 15; 364/424.07; 414/699

[56] References Cited

U.S. PATENT DOCUMENTS

| | | | |
|---|---|---|---|
| 3,749,269 | 7/1973 | Conrad | 414/699 |
| 4,163,628 | 8/1979 | Hall et al. | 414/699 |
| 4,517,645 | 5/1985 | Yuki et al. | 364/424.07 |
| 4,800,660 | 1/1989 | Masao | 37/118 A |

FOREIGN PATENT DOCUMENTS

| | | |
|---|---|---|
| 51-89621 | 8/1976 | Japan . |
| 59-54847 | 3/1984 | Japan . |
| 62-152923 | 7/1987 | Japan . |
| 63-265730 | 11/1988 | Japan . |
| 394509 | 1/1974 | U.S.S.R. ............ 37/DIG. 1 |
| 540990 | 12/1976 | U.S.S.R. ............ 37/DIG. 1 |

Primary Examiner—Dennis L. Taylor
Assistant Examiner—Arlen L. Olsen
Attorney, Agent, or Firm—Spensley, Horn, Jubas & Lubitz

[57] ABSTRACT

The present invention is concerned with an automatic speed changing apparatus preferably employable for a wheel loader. The subject of the present invention is to assure that no shift-down is carried out even when braking is effected and thereby a vehicle speed is reduced when the wheel loader approaches a dump truck (operation IV) during running of the wheel loader, e.g., along V-shaped tracks as shown in FIG. 4, whereby an operation can smoothly be performed without an occurrence of falling-down of load placed on the wheel loader while preventing an operator from feeling unpleasant. To accomplish the foregoing subject, the apparatus of the present invention is constructed such that determination as to whether or not the wheel loader is approaching the dump truck (operation IV) is made based on the determination as to whether or not lift arms (1a) are raised up to perform a loading operation, and if it is found that the foregoing determination is correct, the current speed stage is maintained. In detail, the apparatus is provided with a lift arm position sensor (8) for detecting the raised position of the lift arms (1a) so that a threshold value is preset for the apparatus so as to determine whether the lift arms (1a) are raised up or not. Further, the apparatus is provided with a controller (10) which selects a certain speed stage corresponding to the current speed, if it is found that the raised position of the lift arms (1a) is in excess of the threshold value. Consequently, the present invention is applicable mainly to an automatic speed changing apparatus for a wheel loader.

2 Claims, 4 Drawing Sheets

AUTOMATIC SPEED CHANGING APPARATUS FOR WHEEL LOADER

TECHNICAL FIELD

The present invention relates generally to an automatic speed changing apparatus preferably employable for a wheel loader.

BACKGROUND ART

In general, a wheel loader is used for excavating a hillock using a bucket carried thereby and then placing the scooped gravel on a dump truck. FIG. 4 schematically illustrates by way of a plan view a series of operations from excavation of the wheel loader till loading of the scooped gravel on the dump truck. This represents a typical operation pattern most frequently used with the wheel loader that is called a V-shape operation.

To ultimately shorten a time required for the V-shape operation (comprising operations I to V as identified by arrow marks), it is required that the operation is performed in the following manner.

In this case, it is assumed that the automatic speed changing apparatus performs automatic speed changing from a first speed to a second speed and vice versa during forward/rearward movement of the wheel loader.

Specifically, the wheel loader a moves fast forwardly toward the hillock b at a forward second speed ($F_2$) (operation I). When the wheel loader a comes near to the hillock b (with a distance of 0.5 m to 1.0 m), it plunges into the hillock b while the forward second speed ($F_2$) is shifted down to a forward first speed ($F_1$) to increase a magnitude of tractive force (operation II). On completion of the excavating operation, the wheel loader a moves rearwardly from the excavating operation site at a rearward second speed ($R_2$) (operation III). Thereafter, the direction of running of the wheel loader a is changed to another one to run fast with the forward second speed $F_2$ toward a dump truck c to place the excavated gravel on the dump truck c (operation IV).

On completion of the loading operation on the dump truck c, the wheel loader a moves fast at the rearward second speed $R_2$ away from the dump truck c to return to the original position (operation V).

In this manner, when the wheel loader a performs automatic speed changing during the aforementioned operations, the wheel loader a assumes a speed stage of the second speed without fail at the time of start after changing from the forward movement to rearward movement and vice versa as well as normal running (operations I, III, IV and V). Only when the vehicle speed is reduced lower than a preset vehicle speed during the excavating operation (operation II), the second speed is shifted down to the first speed and the wheel loader a runs at this speed stage.

With the conventional speed changing apparatus, however, there arise the following drawbacks, because the speed stage is automatically shifted down from the forward second speed $F_2$ to the forward first speed $F_1$ corresponding to the vehicle speed.

For example, during an approaching operation of the wheel loader toward the dump truck, i.e., during the operation IV, an operator is required to displace the wheel loader forwardly at the forward second speed $F_2$, raise up lift arms and then visually calculate a distance of approach just in front of the dump truck so as to assure that a bucket position coincides with a loading height above the ground surface for the dump truck. In practice, undesirable mistakes such as incorrect changing from the operation III to the operation IV and incorrect raising of the lift arms up to the loading height just in front of the dump truck take place due to erroneous visual calculation of a size of the loading truck and an approach distance. Further, when the wheel loader comes nearest to the dump truck, similar mistake such as incorrect raising of the bucket position up to the loading height may take place at a narrow field site under a condition that the approach distance is unavoidably shortened.

In view of these mistakes, when a distance between the wheel loader and the dump truck becomes short during the operation IV, an operator depresses a throttle pedal to increase a raising speed of the lift arms. Then, the decelerates the vehicle speed by depressing a braking pedal so as to assure that the bucket is raised up to the loading height just in front of the dump truck.

As the vehicle speed is decreased by depressing the brake pedal, the conventional apparatus is operated such that the forward second speed $F_2$ is automatically shifted down to the forward first speed $F_1$ when the vehicle speed is reduced lower than the preset vehicle speed.

When the forward second speed $F_2$ is shifted down to the forward first speed $F_1$ in that way, the vehicle speed is reduced within a very short period of time to assume a quickly braked state with the result that the load placed on the dump truck falls down and an operator may feel unpleasant. In an extreme case, a certain operation can not be accomplished smoothly.

The present invention has been made with the foregoing background in mind and its object resides in providing an automatic speed changing apparatus preferably employable for a wheel loader which assures that any shift-down does not take place in correspondence to the vehicle speed during the approaching operation toward a dump truck (operation IV).

DISCLOSURE OF THE INVENTION

The present invention provides an automatic speed changing apparatus preferably employable for a wheel loader wherein the apparatus includes a position sensor for detecting the raised position of lift arms and maintaining means for maintaining the speed stage of a transmission which has been currently selected when the raised position detected by the position sensor in excess of a preset position.

During an approaching operation toward the dump truck, the raised position of the lift arms above the preset position is detected by the position sensor, and in response to this detection, the maintaining means maintains the speed stage of the transmission which has been currently selected.

Therefore, even when the vehicle speed is decreased by depressing the brake pedal during the approaching operation toward the dump truck, the current speed stage is maintained without any shift-down. This prevents a quickly braked state from being assumed by the wheel loader due to shift-down. Thus, an occurrence of malfunction that load on the dump truck falls down during running of the wheel loader can be avoided and an operator does not feel unpleasant with the result that an operation can be accomplished smoothly.

BRIEF DESCRIPTION OF THE DRAWINGS

The present invention is illustrated in the following drawings in which.

BEST MODE FOR CARRYING OUT THE INVENTION

Now, the present invention will be described in detail hereinafter with reference to the accompanying drawings which illustrate a preferred embodiment thereof.

Figure 3:
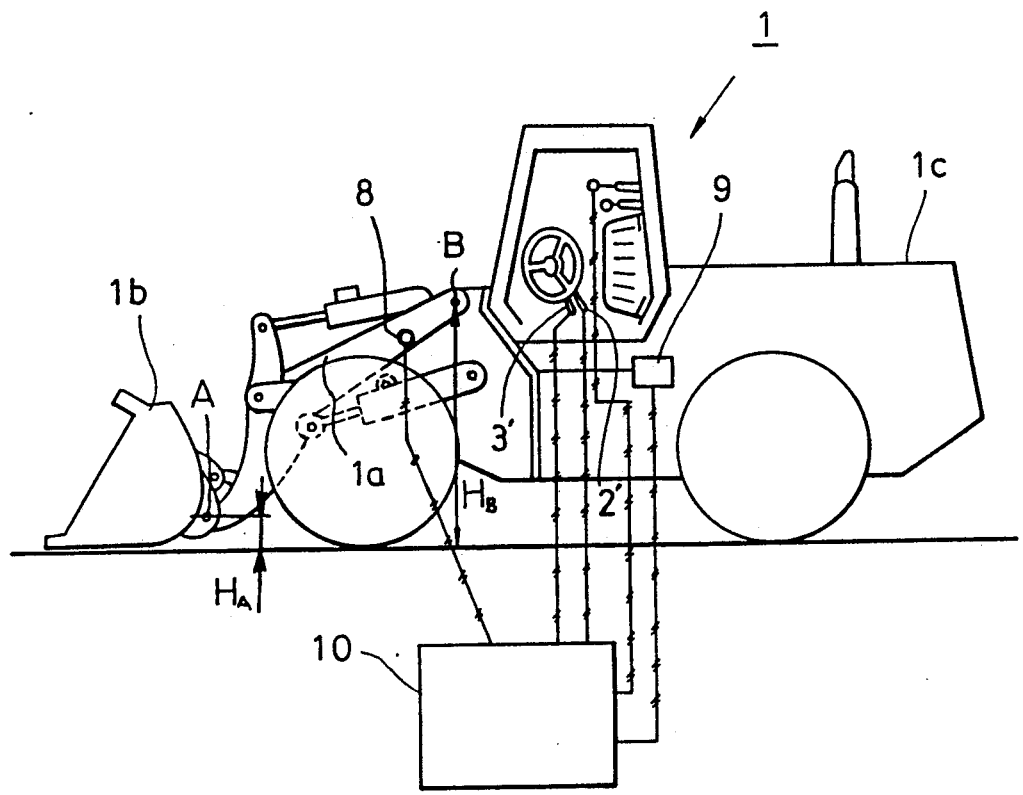
FIG. 3(a) is a side view showing a wheel loader to which the present invention is applied.
FIG. 3(b) is an explanatory view illustrating the arrangement of a plurality of actuating systems on a driver's seat on the wheel loader.
Figure 3:
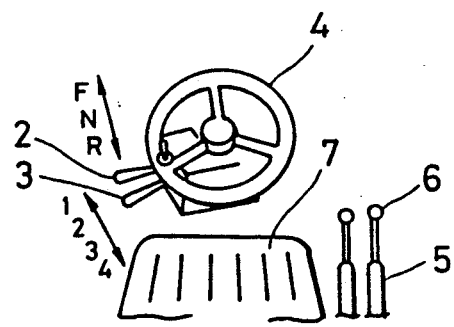
Figure 4:
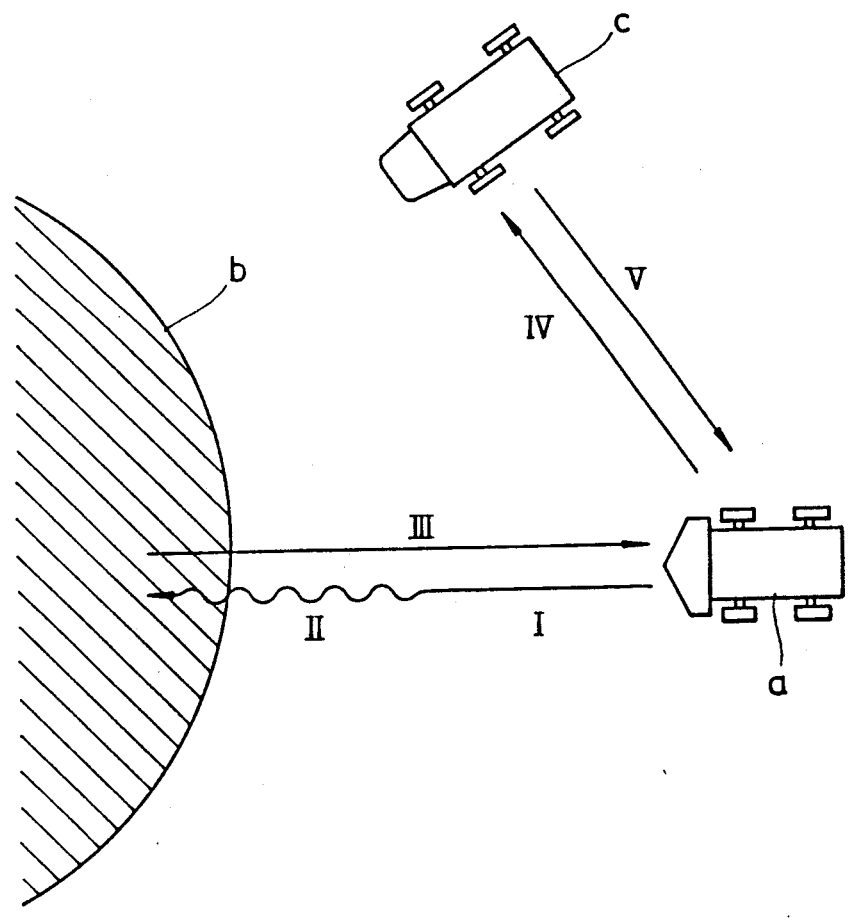
FIG. 4 is an explanatory view showing a operation pattern of the wheel loader during running along V-shaped tracks.

FIG. 3(a) is a side view schematically showing a wheel loader to which the present invention is applied and FIG. 3(b) is an explanatory view which illustrates arrangement of a plurality of actuating systems in the form of a lever on a driver's seat of the wheel loader shown in FIG. 3(a).

Referring to the drawings, a directional lever 2 and a range lever 3 serve as a shift lever for a transmission of the wheel loader 1, respectively. The both levers 2 and 3 are arranged in the vicinity of a steering handle 4. The directional lever 2 is shifted to one of a direction of forward movement F, a neutral position N and a direction of rearward movement R, whereas the range lever 3 is shifted to one of a first speed stage 1, a second speed stage 2, a third speed stage 3 and a fourth speed stage 4.

In response to actuations of the directional lever 2 and the range lever 3, their actuated positions are detected by a directional lever position detecting sensor 2' and a range lever position detecting sensor 3', and signals corresponding to the actuated positions are outputted from the both sensors 2' and 3'.

A lift arm actuating lever 5 serves as an actuating lever for raising or lowering lift arms 1a of the wheel loader 1 and is located sideward of an operator's seat 7. The actuating lever 5 is provided with an automatic speed restoring switch 6, which will be described later, at the top end thereof. An operator visually determines whether the switch 6 should be depressed or not with his finger, by detecting whether a contact of the switch 6 is shifted to ON or OFF.

One of the lift arms 1a is equipped with a lift arm position sensor 8 for detecting the current position of the lift arms 1a which have been raised up. The position sensor 8 is constituted e.g. in the form of an encoder adapted to detect the raised position of the lift arms 1a by detecting an angle of turning movement of the lift arms 1a.

A T/M shift solenoid valve 9 is used for the purpose of speed changing by electrically shifting each speed stage in the transmission of the wheel loader 1 in response to outputting from a controller 10 which will be described later.

An acceleration pedal (not shown in FIGS. 3(a) and (b)) of the wheel loader 1 is equipped with an acceleration position detecting sensor 11 for detecting a throttle signal corresponding to an angle of the depressed pedal, an automatic/manual shifting switch 12 for selectively determining whether speed changing should be performed automatically or manually and then detecting which of automatic speed changing and manual speed changing has been practically selected, by detecting that its contact is shifted to ON or OFF, a vehicle speed detecting sensor 13 for detecting the number of revolutions of an output shaft of the transmission, i.e., detecting a vehicle speed and an engine speed sensor 14 for detecting an engine speed.

If the automatic/manual shifting switch 12 is shifted to the manual side, this represents that the wheel loader 1 moves in the direction of movement (forward or rearward movement) selectively determined by actuation of the directional lever 2 at a certain speed stage (one of the first stage, the second stage, the third stage and the fourth stage) which has been selectively determined by actuation of the range lever 3.

Figure 1:
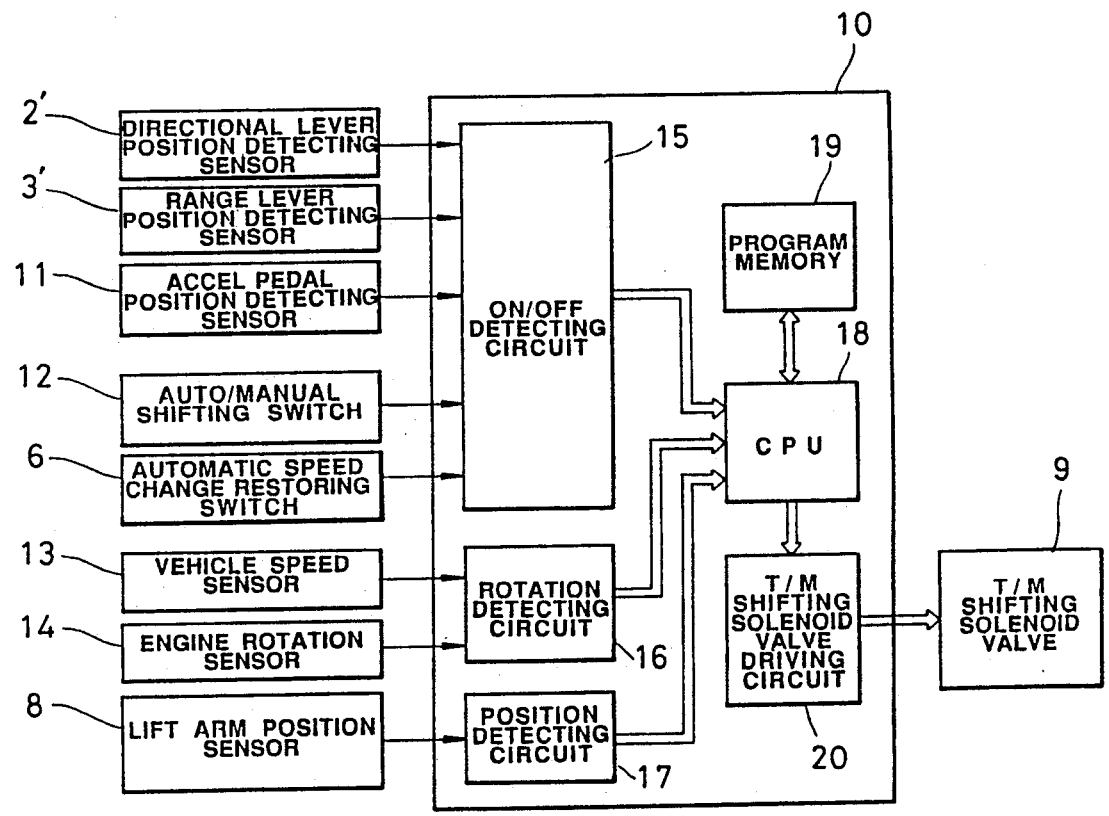
FIG. 1 is a block diagram which schematically illustrates an automatic speed changing apparatus employable for a wheel loader according to the present invention.

FIG. 1 is a block diagram which schematically illustrates the detailed structure of the controller 10.

As is apparent from the drawing, an output from each of the directional lever position detecting sensor 2', the range lever position detecting sensor 3', the acceleration pedal position detecting sensor 11, the automatic/manual shifting switch 12 and the automatic speed change restoring switch 6 is inputted into an ON-OFF detecting circuit 15 in the controller 10. The ON-OFF detecting circuit 15 is such that the actuated position of each lever and the depressed state of each switch are detected in response to the detection signal and the ON-OFF signal from the respective sensors 2', 3' and 11 and the respective switches 12 and 6.

An output from each of the vehicle speed detecting sensor 13 and the engine rotation sensor 14 is inputted into a rotation detecting circuit 16 which in turn detects the current vehicle speed and the current engine speed of the wheel loader 1. Further, an output from the lift arm position sensor 8 is inputted into a position detecting circuit 17 which in turn detects an angle of turning movement of the lift arms 1a. Outputs from the ON/OFF detecting circuit 15, the rotation detecting circuit 16 and the position detecting circuit 17 are inputted into a central processing unit (hereinafter referred to as a CPU) 18.

In addition to the detecting circuits 15, 16 and 17 and the CPU 18, the controller 10 includes a program memory 19 and a T/M shifting solenoid valve driving circuit 20.

The program memory 19 serves as a memory in which a program required for executing a series of processings to be performed by the CPU 18 is stored. The CPU 18 executes a plurality of processings in response to detection signals from the ON/OFF detecting circuit 15, the rotation detecting circuit 16 and the position detecting circuit 17, which will be described later, in accordance with the program stored in the program memory 19.

While the CPU 18 executes one of the processings, a driving command signal for driving the T/M shifting solenoid valve 9 is outputted to the T/M shifting solenoid valve driving circuit 20.

The T/M shifting solenoid valve driving circuit 20 is such that when the driving command signal is inputted thereinto from the CPU 18, the T/M shifting solenoid valve 9 is driven in response to the aforementioned signal so that the transmission performs a speed changing operation.

Figure 2:
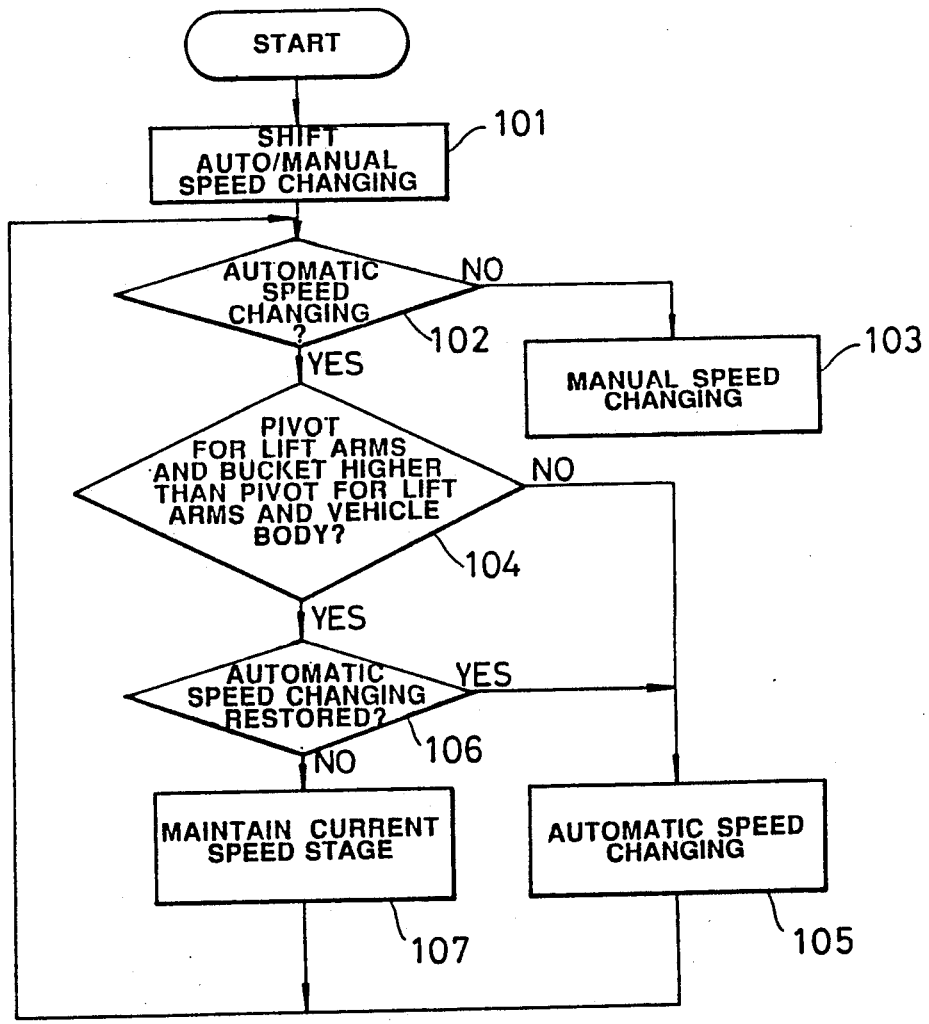
FIG. 2 is a flowchart which shows the procedure of performing a series of processings using a central processing unit shown in FIG. 1.

Here, a series of processings to be performed by the CPU 18 will be described below with reference to a flowchart as shown in FIG. 2.

First, an output signal from the automatic/manual shifting switch 12 among from output signals from the ON/OFF detecting circuit 15 is inputted into the CPU 18 (step 101) and at the step 101, the CPU 18 determines whether the shifting switch 12 is actuated to the automatic speed changing side or not (step 102).

If a result derived from the determination at the step 102 is NO, i.e., if the CPU 18 determines that the shifting switch 12 is actuated to the manual speed side, a driving command signal is outputted to the T/M shifting solenoid valve driving circuit 20 based on the current actuated positions of the directional lever 2 and the range lever 3 (in response to an output from the ON/OFF detecting circuit 15), whereby the transmission performs a selective shifting operation to assume a speed stage corresponding to the actuated position. In response the aforementioned commanding signal, the solenoid valve driving circuit 20 drives the T/M shifting solenoid valve 9 to perform a manual speed changing (step 103).

On the other hand, if a result derived from the determination at the step 102 is YES, i.e., in case where the CPU 18 detects that the shifting switch 12 is actuated to the automatic speed changing side, the process goes to a step 104.

At the step 104, the CPU 18 determines whether or not the wheel loader 1 performs an operation IV, so as to allow the wheel loader 1 to come near to a dump truck.

When it is found that the wheel loader 1 has performed the operation IV, the CPU 18 determines that this is a case where the lift arms 1a should be raised up to place a load on the dump truck. This determination is made based on an angle of turning movement of the lift arms 1a. At this time, a turning angle of the lift arms 1a at which the height $H_A$ of a pivotal point A above the ground surface where a bucket 1b is pivotally supported on the lift arms 1a coincides with the height $H_B$ of a pivotal point B above the ground surface value where the lift arms 1a are pivotally supported on a vehicle body 1c is preset as a threshold value (refer to FIG. 3(a)).

In response to an output from the position detecting circuit 17, the CPU 18 detects an angle of turning movement of the lift arms 1a to determine whether the detected angle is in excess of the threshold value or not (step 104).

If a result derived from the determination at the step 104 is NO, i.e., if the detected turning angle is less than the threshold value (i.e., representing a case where the height $H_A$ above the ground surface is less than the height $H_B$ above the ground surface), the CPU 18 determines that the lift arms 1a are not lifted. This permits the process to go to a step 105.

At the step 105, an automatic speed changing operation is performed.

Specifically, in response to outputs from the ON/OFF detecting circuit 15 and the rotation detecting circuit 16, the CPU 18 outputs a driving command signal to the T/M shifting solenoid valve driving circuit 20 so as to allow the wheel loader 1 to run in the direction of movement thereof determined by actuation of the directional lever 2 (in the forward direction or in the rearward direction) while performing an automatic speed changing from the first speed to the second speed and vice versa corresponding to the current vehicle speed.

On the other hand, if a result derived from the determination at the step 104 is YES, i.e., if the detected turning angle is in excess of the threshold value (representing a case where the height $H_A$ above the ground surface is more than the height $H_B$ above the ground surface), the CPU 18 determines that the lift arms 1a are raised up sufficiently above the ground surface, i.e., the CPU 18 determines that the wheel loader 1 performs the operation IV. Thus, the process goes to a step 106.

At the step 106, in response to an output from the ON/OFF detecting circuit 15, the CPU 18 determines whether the automatic speed change restoring switch 6 is depressed or not.

If a result derived from the determination at the step 106 is NO, i.e., if the CPU 18 determines that the automatic speed change restoring switch 6 is not depressed, the process goes to a step 107.

At the step 107, in response to an output from the ON/OFF detecting circuit 15, the CPU 18 detects the current speed stage, e.g., the forward second speed $F_2$ to maintain this speed stage. In this case, even though the vehicle speed of the wheel loader 1 is reduced to a lower vehicle speed within the range defined by the forward speed stage $F_1$, a driving command signal for selecting the forward first speed $F_1$ is not outputted to the T/M shifting solenoid valve driving circuit 20 any longer (step 107).

Thereafter, while the automatic/manual shifting switch 12 is shifted to the automatic speed changing side and the lift arms 1a are raised up (representing a case where the height $H_A$ is equal to or more than the height $H_B$), the vehicle speed stage indicative of the forward second speed $F_2$ can be maintained, even though the vehicle speed of the wheel loader 1 is reduced to the range defined by the speed stage indicative of the forward first speed $F_1$ by repeatedly executing the processings at the steps 102 to 107. However, when the automatic speed change restoring switch 6 is depressed, a result derived from the determination at the step 106 becomes YES, whereby the process goes to the step 105 at which a normal automatic speed changing is executed in correspondence to the current vehicle speed.

As will be readily apparent from the above description, according to the shown embodiment of the present invention, the current speed stage (e.g., $F_2$) can be maintained while the lift arms 1a are raised up. Consequently, the wheel loader 1 can run without any occurrence of shift-down during an approaching operation toward the dump truck (i.e., IV). This prevents any load placed on the wheel loader 1 from falling down therefrom during running along V-shaped tracks. Since an operator does not feel unpleasant during such running, he can perform his operation smoothly.

The shown embodiment has been described above with respect to a case where a threshold value required for determining whether the lift arms 1a are raised up or not is set as an angle of turning movement of the lift arms 1a at which the height $H_A$ above the ground surface becomes equal to the height $H_B$ above the ground surface. However, the present invention should not be limited only to this. Alternatively, a threshold value may be set arbitrarily, if it is proven that the CPU 18 can detect that the lift arms 1a are raised up. Further, according to the embodiment of the present invention, an encoder can be used for the lift arm position sensor 8. It should be added that a limit switch may be used in place of the encoder.

The present invention has been described above with respect to an automatic speed changing type vehicle with which the second speed is automatically shifted to the first speed and vice versa. It should of course be understood that the present invention may be applied to a fully automatic speed changing type vehicle with which the second speed is automatically shifted to the first speed stage and vice versa and moreover automatic speed changing is effected within the range from the second speed to the fourth speed.

INDUSTRIAL APPLICABILITY

As described above, the automatic speed changing apparatus for a wheel loader in accordance with the present invention is preferably employable for a wheel loader which operates at a field site where it runs along the V-shaped tracks.

We claim:

1. An automatic speed changing apparatus employable for a wheel loader wherein speed changing is effected by automatically selecting a certain speed stage in a transmission corresponding to the current vehicle speed, said apparatus comprising;
   a position sensor for detecting a position where lift arms on said wheel loader are raised up, and
   maintaining means for maintaining the selected current speed stage in the transmission when it is found that the raised position of the lift arms which has been detected by said position sensor is higher than a preset position.

2. An automatic speed changing apparatus employable for a wheel loader as claimed in claim 1, wherein said preset position represents a raised position of the lift arms where a height of a pivotal point at which a bucket is pivotally supported by the lift arms above the ground surface coincides with a height of a pivotal point at which the lift arms are pivotally supported on a vehicle body above the ground surface.

* * * * *